US012626946B2

(12) United States Patent
Wu et al.

(10) Patent No.: US 12,626,946 B2
(45) Date of Patent: May 12, 2026

(54) PROTECTIVE LAYER FOR AN ELECTROLYTE IN A FLOW BATTERY

(71) Applicant: UOP LLC, Des Plaines, IL (US)

(72) Inventors: Jinfeng Wu, Kildeer, IL (US); Stuart R. Miller, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 757 days.

(21) Appl. No.: 17/820,273

(22) Filed: Aug. 17, 2022

(65) Prior Publication Data

US 2023/0163337 A1    May 25, 2023

Related U.S. Application Data

(60) Provisional application No. 63/283,015, filed on Nov. 24, 2021.

(51) Int. Cl.
*H01M 8/18* (2006.01)
*H01M 8/04082* (2016.01)
*H01M 8/04186* (2016.01)

(52) U.S. Cl.
CPC ....... *H01M 8/188* (2013.01); *H01M 8/04186* (2013.01); *H01M 8/04201* (2013.01)

(58) Field of Classification Search
CPC ............. H01M 8/188; H01M 8/04186; H01M 8/04201
See application file for complete search history.

(56) References Cited

U.S. PATENT DOCUMENTS

| | | | |
|---|---|---|---|
| 3,350,553 A * | 10/1967 | Cline | ........................ F21K 2/06 |
| | | | 252/700 |
| 6,143,443 A | 11/2000 | Kazacos et al. | |
| 2002/0055037 A1* | 5/2002 | Rhoten | ............. H01M 10/0418 |
| | | | 429/138 |
| 2013/0011702 A1 | 1/2013 | Horne et al. | |
| 2014/0193673 A1 | 7/2014 | Woolery et al. | |
| 2014/0272482 A1 | 9/2014 | Li et al. | |
| 2017/0179516 A1 | 6/2017 | Evans et al. | |

FOREIGN PATENT DOCUMENTS

| | | | |
|---|---|---|---|
| CN | 1056020 A | | 11/1991 |
| CN | 101872847 A | | 10/2010 |
| CN | 104900892 B | * | 10/2017 |
| EP | 0729648 A1 | | 9/1996 |

(Continued)

OTHER PUBLICATIONS

Han Su et al., Recent progress of sulfide electrolytes for all-solid state lithium batteries, Energy Materials, 2022, 200005, DOI: 10.20517/energymater.2022.01.

(Continued)

*Primary Examiner* — Matthew J Merkling

(57) ABSTRACT

A protective layer for an electrolyte in a flow battery and an electrolyte tank having a protective layer. The protective layer includes a light oil that includes hydrophobic hydrocarbons. The light oil having a density lower than a density of the electrolyte, the hydrophobic hydrocarbons being non-reactive to the electrolyte. The protective layer may be a liquid layer or may include a substrate impregnated with the light oil. An inert gas may also be utilized in the electrolyte tank.

13 Claims, 5 Drawing Sheets

(56) References Cited

FOREIGN PATENT DOCUMENTS

| JP | 2016103386 A | * | 6/2016 |
| JP | 2018506825 A | * | 3/2018 |

OTHER PUBLICATIONS

EUDP, Grid-scale flow batteries, EUDP Final Report, Sep. 2021, EUDP 2019-II, 64019-0566.
International Search Report from corresponding PCT application No. PCT/US2022/080144, mailed on Apr. 6, 2023.
Written Opinion from corresponding PCT application No. PCT/US2022/080144, completed on Apr. 6, 2023.
Extended European Search Report from corresponding European application No. 22899481.0 dated Dec. 3, 2025 (8 pages).

* cited by examiner 34, 36

54

50

30, 32, 52

PROTECTIVE LAYER FOR AN ELECTROLYTE IN A FLOW BATTERY

RELATED APPLICATIONS

This application claims priority to U.S. Patent Application Ser. No. 63/283,015 filed on Nov. 24, 2021, the entirety of which is incorporated herein by reference.

FIELD OF THE INVENTION

This invention relates generally to flow batteries, and more particularly to a protective layer for use in the electrolyte tanks to protect the electrolyte from oxidization and/or evaporation.

BACKGROUND OF THE INVENTION

The large-scale integration of renewable energy derived from solar or wind sources into the electric grid requires robust energy storage systems to improve its reliability, power quality, and economy. Among various energy storage technologies that having been considered and explored, redox flow batteries (RFB) are unique because they can convert electrical energy into chemical potential energy by means of a reversible electrochemical reaction between two aqueous electrolyte solutions. The redox electroactive species can be stored in external tanks and introduced into the batteries when needed. RFBs generally comprise flow cell stack with multiple separation membranes, two circulation pumps, and two external storage tanks filled with active materials containing metal ions that may be in different valance states. Therefore, the power and energy capacity can be independent, indicating that the storage capacity is determined by the quantity of electrolyte used and the rating power is decided by the active area as well as the cell number of the battery stacks.

Compared with the other redox flow battery technologies, such as all-vanadium redox flow battery, zinc-bromine redox flow battery, or iron-chromium redox flow battery, all iron redox flow batteries (IFB) are particularly attractive for grid scale storage applications because of its advantages such as low chemical toxicity and very low material cost by utilizing abundantly available iron, salt, and water as the electrolyte.

IFBs have iron in different valence states as both the positive and negative electrolytes for the positive and negative electrodes, respectively. The iron-based positive and negative electrolyte solutions stored in the external storage tanks flow through the stacks of the batteries. In the positive side, half-cell reaction involves $Fe^{2+}$ losing electrons to form $Fe^{3+}$ during charge and $Fe^{3+}$ gaining electrons to form $Fe^{2+}$ during discharge, and the positive reaction is given by Equation 1. For the negative side, half-cell reaction involves the plating and stripping of iron in the form of a solid plate, and the reaction is represented by Equation 2. The overall IFB reaction is shown in Equation 3.

$$\text{Positive electrode: } 2Fe^{2+} \leftrightarrow Fe^{3+} + 2e^- \ E^0 = -0.77V \qquad \text{Eq. (1)}$$

$$\text{Negative electrode: } Fe^{2+} + 2e^- \leftrightarrow Fe^0 \ E^0 = -0.44V \qquad \text{Eq. (2)}$$

$$\text{Total: } 3Fe^{2+} \leftrightarrow Fe^0 + 2Fe^{3+} \ E^0 = 1.21V \qquad \text{Eq. (3)}$$

The Equations 1 and 2 indicate that the standard potentials of both positive and negative redox couples in an IFB battery are lower than that of the oxygen reduction reaction, as shown below in Equation 4, below.

$$O_2 + 4H^+ + 4e^- = 2H_2O, \ E^0 = 1.229 \text{ V} \qquad \text{Eq. (4)}$$

Consequently, both catholyte and anolyte electrolytes in IFB are prone to be oxidized by air. During IFB operating, the ideal pHs of catholyte and anolyte electrolytes are in the range of 0-1 and 4-5, respectively.

The oxidation of $Fe^{2+}$ to $Fe^{3+}$ in catholyte side can cause catholyte and anolyte electrolytes imbalance, shift in electrolyte average oxidation state (AOS), as well as redox flow battery system capacity decay, as displayed in Equation 5.

$$4Fe^{2+} + O_2 + 4H^+ = 4Fe^{3+} + 2H_2O \qquad \text{Eq. (5)}$$

$$12Fe^{2+} + 3O_2 + 6H_2O = 8Fe^{3+} + 4Fe(OH)_3 \qquad \text{Eq. (6)}$$

For anolyte side, the air oxidation of anolyte electrolyte will bring even worse consequences because of the higher pH of anolyte electrolyte. As shown in the Equation 6, the oxidation of $Fe^{2+}$ to $Fe^{3+}$ and the subsequent precipitation of particulate forms of $Fe^{3+}$ like ferric hydroxide $Fe(OH)_3$ can not only cause the electrolyte AOS increase and severe capacity loss, but also block the flow channel, increase the flow resistance and IFB area specific resistance (ASR), and eventually lead to irreversible damage to IFB stack. Therefore, it is desirable to avoid oxygen containing the electrolyte.

Current solutions to minimize or avoid air ingress, and the electrolyte oxidation, is to fill, purge, or pressurize the positive and negative electrolyte tanks constantly or periodically with inert gas, such as argon (Ar) or nitrogen ($N_2$), during IFB operating. The addition of an inert gas generator or inert gas cylinders to energy storage plants significantly increases the complexity of the system, the battery product capital, and maintenance costs. Further such a protection scheme is not very stable and this makes it difficult and costly for the transport and/or the long-term storage of electrolyte.

Accordingly, it would be desirable to have more effective and efficient designs to protect the electrolytes in such a flow battery from exposure to oxygen.

SUMMARY OF THE INVENTION

One or more protective layers have been invented for protecting electrolytes used in a flow battery from being oxidized by air and/or from weight loss by evaporation. The new protective layers simplify the system design and improve the IFB product durability as well as reliability. In general, as will be explained in more detail below, the protective layers include an oil layer on top of the electrolyte. The oil may be a liquid layer, or it may be impregnated or otherwise added to a supporting substrate.

Therefore, the present invention may be characterized, in at least one aspect, as providing a protective layer for an electrolyte in a flow battery, the protective layer having: a light oil comprising hydrophobic hydrocarbons, the light oil having a density lower than a density of the electrolyte, the hydrophobic hydrocarbons are non-reactive to the electrolyte.

The protective layer may be a liquid layer.

The protective layer may further include a substrate comprising the light oil. The substrate may be an oil absorbing material. The oil absorbing material may be natural fabrics, synthetic fabrics, inorganic material, and biomass materials. The substrate may have a thickness between 0.1 to 100 cm.

The light oil may be silicone oil, mineral oils, vegetable oils, or combinations thereof.

The present invention, in a second aspect, may be broadly characterized as providing an electrolyte tank for a flow battery, the electrolyte tank having: a closed vessel having an inlet and an outlet, a liquid electrolyte in the closed vessel, and a liquid protective layer on top of the liquid electrolyte. The protective layer includes a light oil comprising hydrophobic hydrocarbons, the light oil having a density lower than a density of the electrolyte, the hydrophobic hydrocarbons are non-reactive to the electrolyte.

The light oil may be silicone oil, mineral oils, vegetable oils, or combinations thereof.

The liquid protective layer may have a thickness between 0.1 to 100 cm.

The electrolyte tank may further include an inert gas disposed between the liquid protective layer and the vessel.

The electrolyte may be a catholyte electrolyte, an anolyte electrolyte, a fresh electrolyte, or combinations thereof.

The present invention, in a third aspect, may be characterized, generally, as providing an electrolyte tank for a flow battery, the electrolyte tank comprising: a closed vessel having an inlet and an outlet, a liquid electrolyte in the closed vessel, and a protective layer on top of the liquid electrolyte. The protective layer includes a substrate impregnated with a light oil comprising hydrophobic hydrocarbons. The light oil have a density lower than a density of the electrolyte, the hydrophobic hydrocarbons are non-reactive to the electrolyte.

The substrate may be an oil absorbing material. The oil absorbing material may be a natural fabrics, synthetic fabrics, inorganic material, and biomass materials.

The substrate may have a thickness between 0.1 to 100 cm.

The light oil may be silicone oil, mineral oils, vegetable oils, or combinations thereof.

The electrolyte tank may also include an inert gas disposed between the liquid protective layer and the vessel. The inert gas may be nitrogen or argon.

The electrolyte may be a catholyte electrolyte, an anolyte electrolyte, a fresh electrolyte, or combinations thereof.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

As mentioned above, the present invention is directed at protective layers that reduce or eliminate the oxidation of electrolytes in a flow battery. The protective layers utilize a layer of oil on top of the electrolyte, which may be a liquid layer or a solid substrate that is supporting the oil. An inert gas may be used in conjunction with the protective layer; however, the use of the protective layer protects the electrolyte better than the use of only the inert gas since it blocks the electrolyte from directly contacting the gas in the headspace of the electrolyte tank.

With these general principles in mind, one or more embodiments of the present invention will be described with the understanding that the following description is not intended to be limiting.

Figure 1:
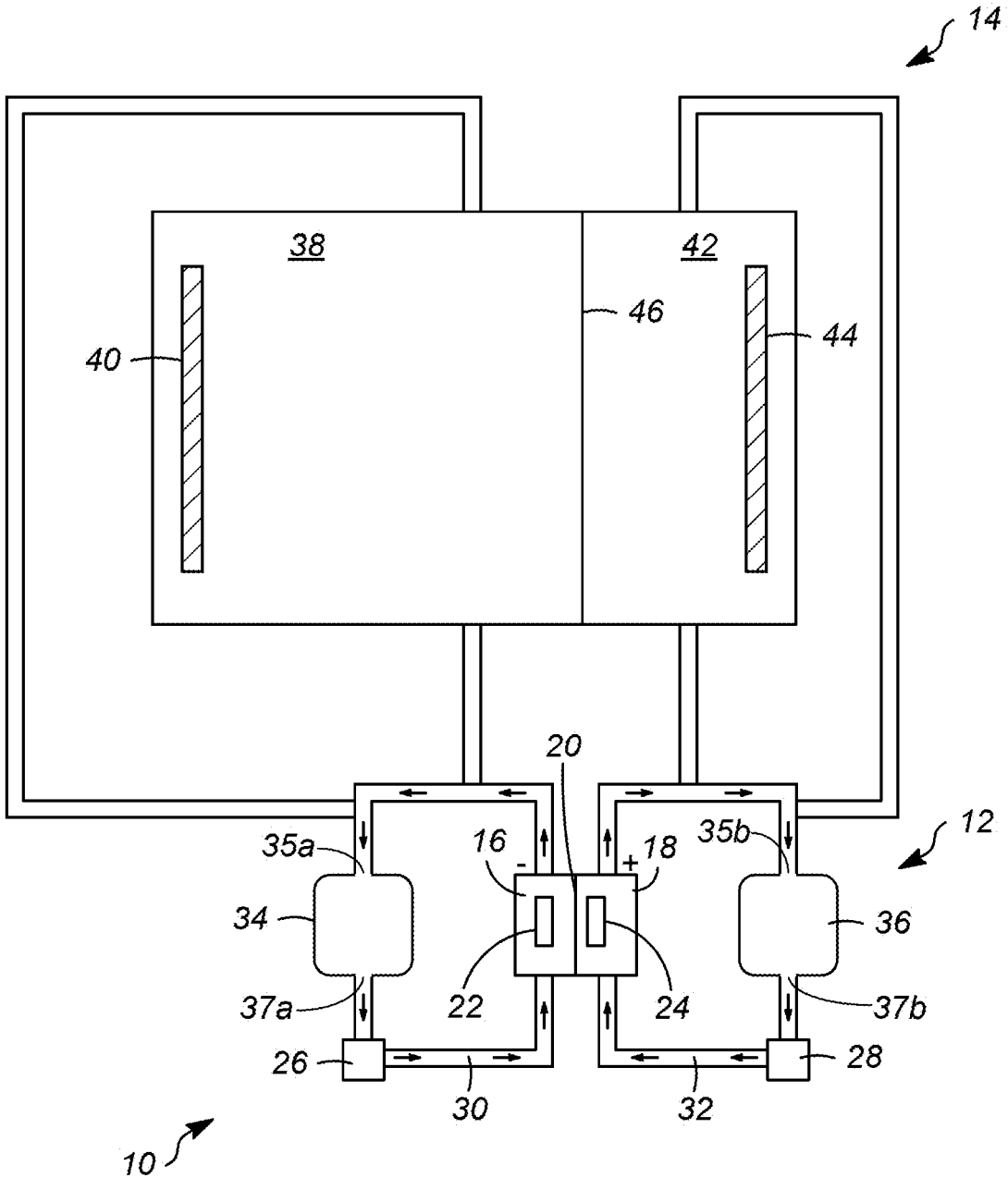
FIG. 1 is a schematic view of a redox flow battery with a balancing cell.

As shown in FIG. 1, a flow battery 10 includes a redox flow battery cell 12 and an electrochemical balancing cell 14. The redox flow battery cell 12 includes two oppositely charged half cells 16, 18 with a separator 20 between the two half cells 16, 18 of the electrochemical cell. The separator 20 can be comprised of an ionic conducting material such as a microporous or ion-exchange membrane.

Each half cell 16, 18 includes an electrode 22, 24 that is formed from a suitably conductive material, such as a metal, carbon, graphite, and the like, and the materials for two can be the same or different. Pumps 26, 28 circulate an electrolyte 30, 32 from electrolyte tanks 34, 36, or vessels, to one of the half cells 16, 18. Each of the electrolyte tanks 34, 36 includes one or more inlets 35a, 35b and one or more outlets 37a, 37b.

In the depicted redox flow battery cell 12, a first electrode 22 is an anode and a first electrolyte 30 is an anolyte. Accordingly, the second electrode 24 is the cathode and the second electrolyte 32 is a catholyte. This is merely exemplary and is not intended to be limiting.

In a known manner, the electrodes 22, 24 are in electrical communication through a closed circuit which causes reactions at the electrodes 22, 24. As discussed above, over the course of time, hydrogen gas is generated at the anode 22 and circulates within the anolyte 30. In addition to lowering the state of charge of the anolyte 30 (compared with the catholyte 32), the production of the hydrogen gas results in an increase pH of the anolyte 30. Further, flows of ions though the separator 20 offsets the charge balance between the anolyte 30 and the catholyte 32. To counteract the production of the hydrogen, the pH change and the state of change imbalance, the anolyte 30 and the catholyte 32 are passed to the electrochemical balancing cell 14.

Generally, the electrochemical balancing cell 14 includes a first chamber 38 which receives one of the electrolytes 30, 32 and which includes a catalyst coated substrate 40. The electrochemical balancing cell 14 also includes a second chamber 42 which receives the other of the electrolytes 30, 32 and which includes an electrode 44. A separator 46 forms an interface between the first and second chambers 38, 42. Based on a voltage applied, hydrogen in the anolyte 30 can be oxidized at the catalyst coated substrate 40.

Figure 2:
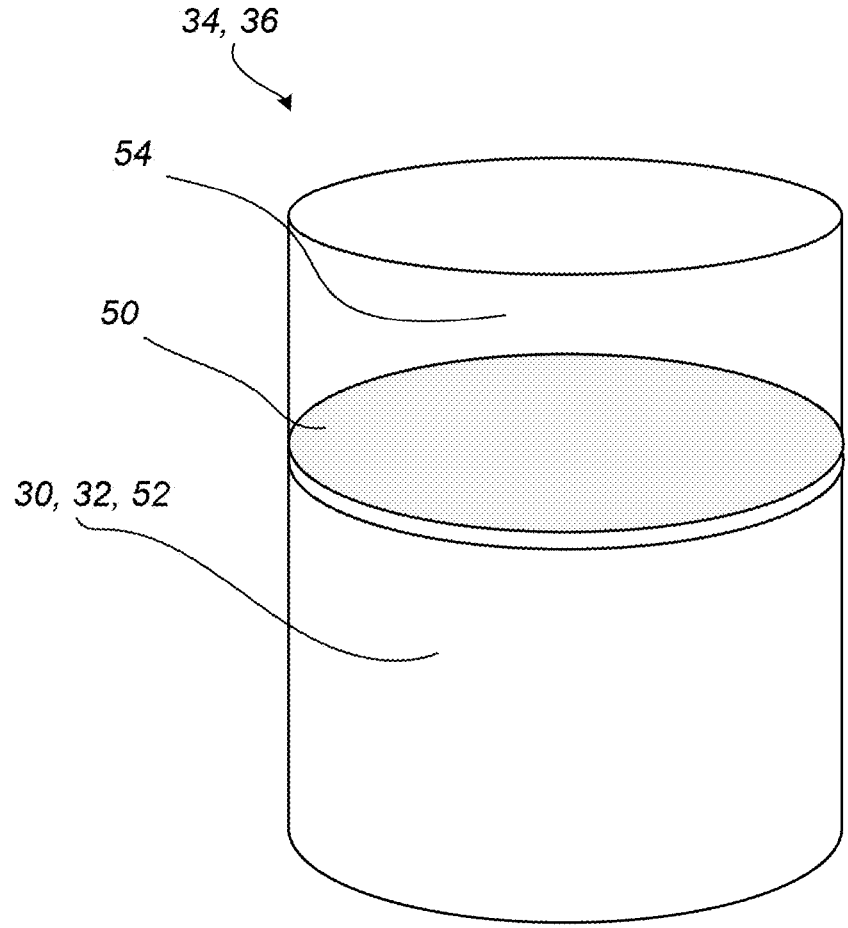
FIG. 2 is a schematic view of a protective layer in an electrolyte tank according to one or more embodiments of the present invention.

Accordingly, turning to FIG. 2, the present invention provides a protective layer 50 to protect the catholyte 32, and/or the anolyte 30, and/or fresh electrolyte 52 from being oxidized by air. The protective layer 50 is formed from a light oil. The light oil includes long or short chain hydrophobic hydrocarbons. The light oil has a density lower than a density of the electrolytes 30, 32, 52. Additionally, the hydrophobic hydrocarbons are non-reactive to the electrolytes 30, 32, 52. For example, the light oil can be one or mixture of the silicone oil, mineral oils like transformer oil, or vegetable oils with large molecules like corn oil.

Accordingly, in a first embodiment, the protective layer 50 is a liquid layer which is formed from the light oil covering the electrolyte(s) 30, 32, 52. Due to its fluidity, one of the advantages of the protective layer 50 that is a liquid is that the interface between the gas atmosphere and electrolyte 30, 32, 52 can be covered completely. It is flexible and will conform to any shape or size of a container with an electrolyte 30, 32, 52, including electrolyte bottles for research cells, the tanks for stack plants, and the containers for battery products.

Additionally, the employment of a liquid only as the protective layer 50 simplifies the preparation and implementation processes. The light oil on the surface of the electrolytes can be removed or separated by using an oil adsorption material.

The thickness of the protective layer 50 that is a liquid may range from 0.1 to 100 cm, preferably from 0.2 to 10 cm.

The protective layer 50 formed from a liquid is air impermeable. If it is utilized to cover the entire interface between the electrolyte 30, 32, 52 and gas environment 54 in the electrolyte tank 34, 36, the protective layer 50 is able to protect or alleviate effectively the electrolyte 30, 32, 52 from air ingress and oxidation. The protective layer 50 can also substantially reduce the weight loss in electrolyte 30, 32, 52 resulted from water and acid evaporation, and the consequent electrolyte 30, 32, 52 precipitation, which can be employed to protect the electrolyte 30, 32, 52 during transportation and long-term storage.

In a second embodiment, the protective layer 50 includes a substrate that impregnated or otherwise saturated with light oil. Again, the light oil includes long or short chain hydrophobic hydrocarbons with a density lower than a density of the electrolytes 30, 32, 52 and non-reactive to the electrolytes 30, 32, 52.

The substrate is an oil adsorbing material that has lipophilic surface characteristic. It is not required that the oil adsorbing material have high hydrophobicity electrolytes; however, it would be beneficial for the protective layer 50. The oil adsorbing material should be a material with high oil retention ability, excellent corrosion resistance, good reusability, rapid adsorption rates, relatively inexpensive, high adsorption capacity, and thermal stability. The densities of both the oil adsorbing material felt and the light oil should be less than that of the electrolytes 30, 32, 52. Accordingly, the protective layer 50 with a substrate soaked with light oil will floats on the surface of the electrolytes 30, 32, 52.

The oil absorbing material in the composite protective layer may be made from natural fabrics material like cotton or synthetic fabrics such as polymeric fabrics material like polyurethane (PU), polypropylene (PP), polyethylene (PE), and cross-linked polymers. The oil absorbing material may be an inorganic material such as activated carbon foam and carbon nanotube (CNT)-based aerogels/sponges. Further, the oil absorbing material may be a biomass material such as porous cellulose foam.

The substrate may be designed in single layer or multilayer in the form of spacer, felt, foam, pad, or sponge. The substrate may have a thickness ranging from 0.1 to 100 cm, preferably from 0.2 to 10 cm.

The protective layer 50 can be prepared by utilizing the oil absorbing material over, fully, or partially saturated with light oils.

Again, the protective layer 50 with a substrate reduces or prevents oxidation of the electrolyte 30, 32, 52, as well as reduces weight loss of the electrolyte 30, 32, 52. Additionally, the protective layer 50 with a substrate may allow hydrogen to permeate (accumulated as a result of hydrogen evolution reaction (HER)) and escape from the electrolyte 30, 32, 52 through the protective layer 50 into gas headspace 54. Moreover, the protective layer 50 with a substrate protects the electrolyte 30, 32, 52 from surrounding pollution such as plastic debris and dust particles, which might enter the flow pipeline or IFB stack and block flow channels. The protective layer 50 with a substrate has flexibility in position, and it continues to change with the electrolyte height in the container or tank 34, 36. Finally, when desired, the protective layer 50 with a substrate may be removed from the electrolyte tank 34, 36 without damage to IFB system and may be reused when desired.

In either embodiment, with a protective layer 50 with a substrate or with a protective layer 50 that is a liquid, an inert gas may be added into the gas headspace 54 of the electrolyte tank 34, 36. The inert gas may be nitrogen or argon. The use of the inert gas with the protective layer 50 will provide better protection for the electrolyte 30, 32, 52 from air ingress and oxidation compared with using only inert gas.

EXAMPLES

Protective Layer with Substrate

Figure 3:
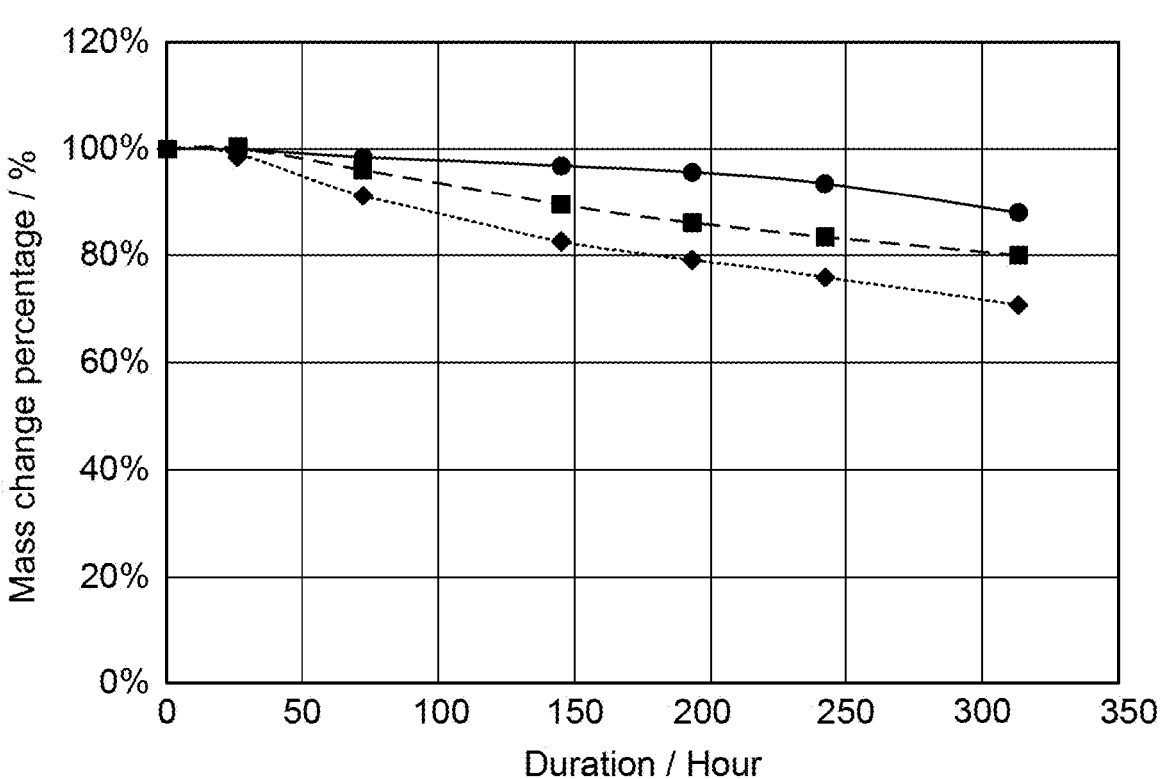
FIG. 3 is a graph of experimental results comparing an electrolyte protected with a protected layer according to one or more embodiments and an electrolyte without a protective layer.

A 0.5 mm polyester felt and a 1.75 mm polyester felt were cut to match the cross section of bottles. Each was soaked in light oil (WHAT WAS USED) for 30 minutes. After the soaking, each protective layer was put into a bottle containing 50 ml of fresh electrolyte. The bottles of electrolytes were placed in a fume hood, without lids. The mass of the electrolytes in the bottles was measured over the course of 300 hours. The results of the change in mass are shown in FIG. 3.

The weight losses of electrolytes were quantified and the electrolyte without a protection layer lost about 30% of its weight in 300 hours when placed in fume hood. Compared with the electrolyte without protection, the electrolyte protected with 0.5 mm protective layer showed a weight loss of about 20% in 300 hours. The electrolyte protected with a 1.75 mm protective layer lost only about 10% of its weight in 300 hours.

Figure 4:
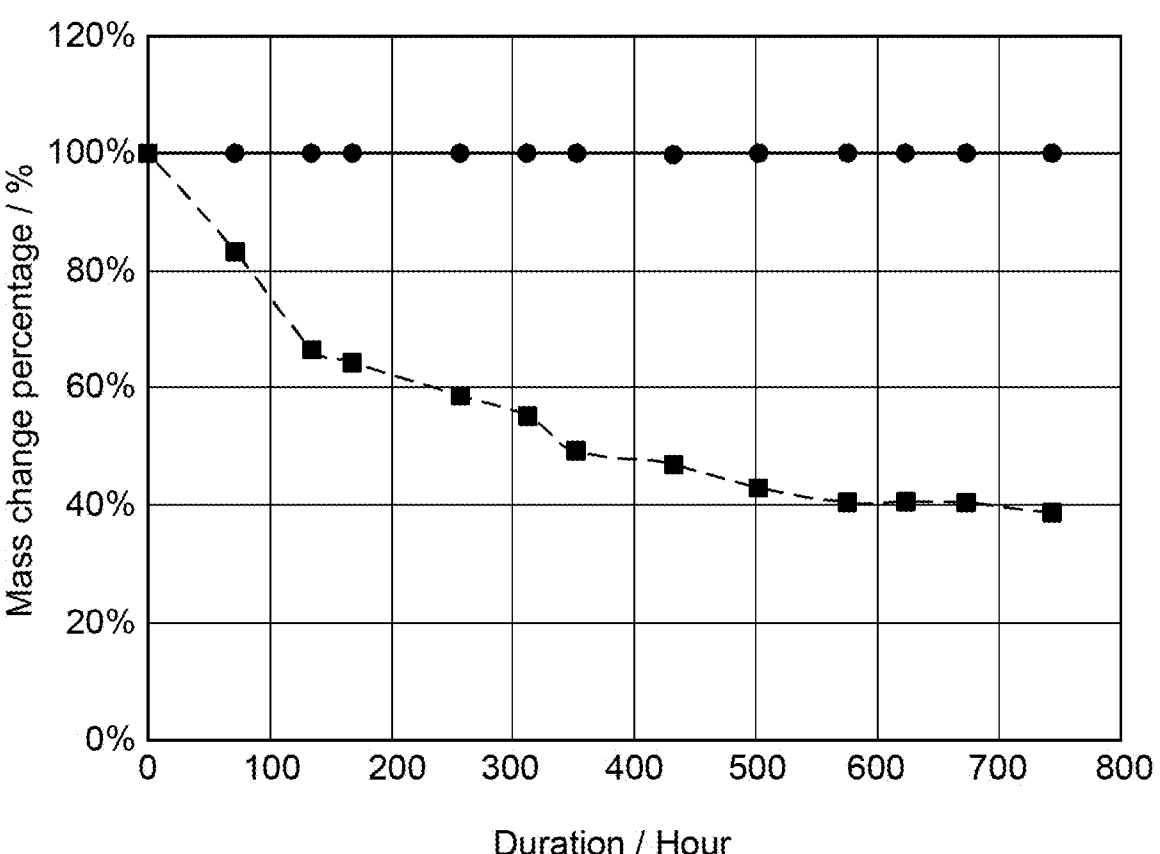
FIG. 4 is another graph of experimental results comparing an electrolyte protected with a protected layer according to one or more embodiments and an electrolyte without a protective layer; and, FIG. 5 is a further graph of experimental results comparing an electrolyte protected with a protected layer according to one or more embodiments and an electrolyte without a protective layer.

Anolyte with Liquid Protective Layer 20 ml of an anolyte was added to two glass bottles separately. Both bottles were put in a fume hood with their lids off. To one of the bottles, 5 ml of light oil were added. This was measured to be a 3 mm thick protective layer. As with the previous experiment, the mass of the electrolyte in the bottles was measured over the course of 700 hours. The results of the change in mass are shown in FIG. 4.

The volume of the anolyte protected with light oil had almost no change in 432 hours storage. The color of the anolyte with protection slowly changed from green to light brown, which implies that the 3 mm thickness of protection may not be sufficient to completely prevent air ingress and oxidation, but it is sufficient to prevent weight loss.

The volume of the anolyte in the bottle without protection noticeably decreased with time, and its color turned into dark brown after 432 hours storage. In fact, $Fe(OH)_3$ rust clearly formed and floated on the surface at the $256^{th}$ hour for the unprotected anolyte. The anolyte without protection dried out with time, and chunks of $Fe(OH)_3$ rust remained after 432 hours storage.

Figure 5:
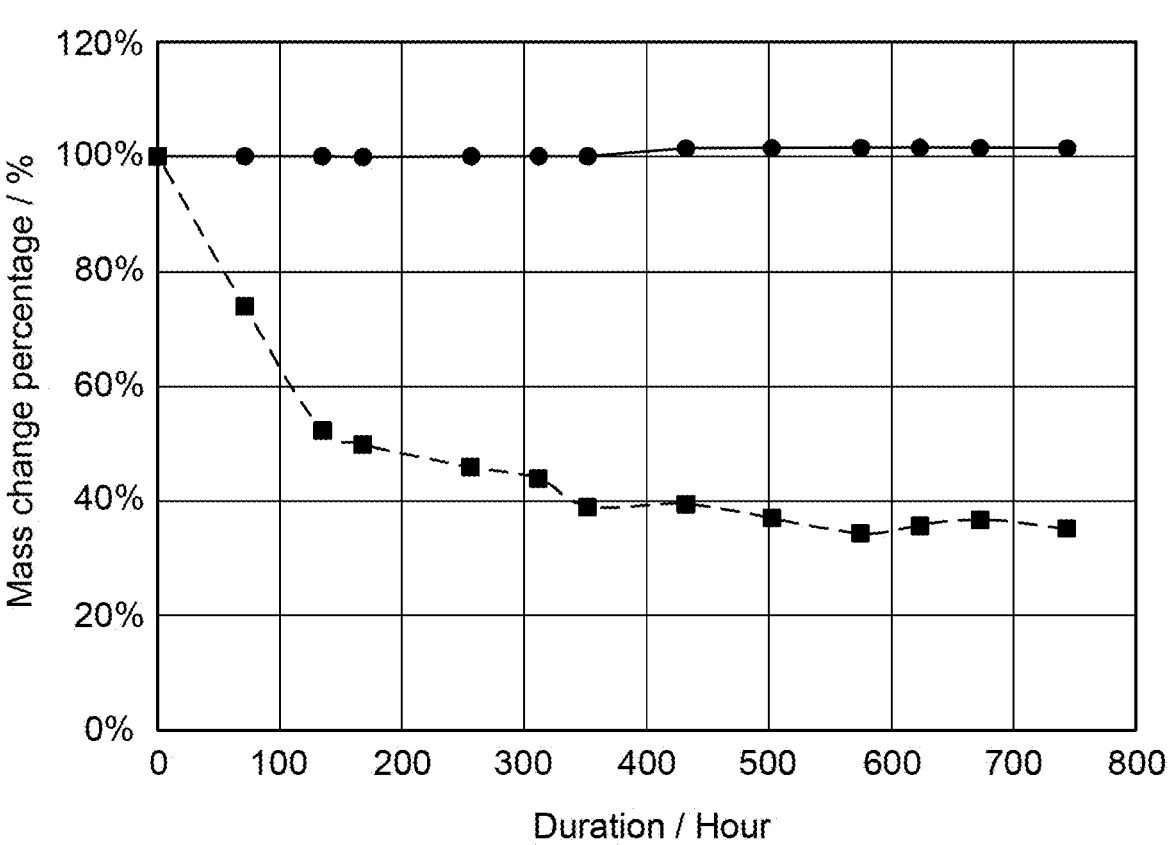

Catholyte with Liquid Protective Layer 20 ml of a catholyte was added to two bottles separately. Both bottles were put in a fume hood with their lids off. To one of the bottles, 5 ml of light oil were added. This was measured to be a 3 mm thick protective layer. Once again, the mass of the electrolyte in the bottles was measured over the course of 700 hours. The results of the change in mass are shown in FIG. 5.

The catholyte protected with a protective layer of light oil had almost no change after 743 hours. The volume of the catholyte in the bottle without protection dramatically decreased with time, and its color turned significantly darker after 743 hours storage. Eventually, the catholyte without protection dried out, and became highly concentrated FeCl$_3$ with significant precipitation.

Thus, with a protective layer, either a liquid layer or a substrate, the electrolyte may be protected from weight loss and oxidation.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a protective layer for an electrolyte in a flow battery, the protective layer comprising a light oil comprising hydrophobic hydrocarbons, the light oil having a density lower than a density of the electrolyte, the hydrophobic hydrocarbons being non-reactive to the electrolyte. An embodiment of the invention is one, any or all of prior embodiments in this paragraph up through the first embodiment in this paragraph, wherein the protective layer comprises a liquid layer. An embodiment of the invention is one, any or all of prior embodiments in this paragraph up through the first embodiment in this paragraph, wherein the protective layer further comprises a substrate comprising the light oil. An embodiment of the invention is one, any or all of prior embodiments in this paragraph up through the first embodiment in this paragraph, wherein the substrate comprises an oil absorbing material. An embodiment of the invention is one, any or all of prior embodiments in this paragraph up through the first embodiment in this paragraph, wherein the oil absorbing material is selected from a group consisting of natural fabrics, synthetic fabrics, inorganic material, and biomass materials. An embodiment of the invention is one, any or all of prior embodiments in this paragraph up through the first embodiment in this paragraph, wherein the substrate has a thickness between 0.1 to 100 cm. An embodiment of the invention is one, any or all of prior embodiments in this paragraph up through the first embodiment in this paragraph, wherein the light oil is selected from a group consisting of silicone oil, mineral oils, vegetable oils, or combinations thereof.

A second embodiment of the invention is an electrolyte tank for a flow battery, the electrolyte tank comprising a closed vessel having an inlet and an outlet, a liquid electrolyte in the closed vessel, and a liquid protective layer on top of the liquid electrolyte, wherein the protective layer comprises a light oil comprising hydrophobic hydrocarbons, the light oil having a density lower than a density of the electrolyte, the hydrophobic hydrocarbons being non-reactive to the electrolyte. An embodiment of the invention is one, any or all of prior embodiments in this paragraph up through the second embodiment in this paragraph, wherein the light oil is selected from a group consisting of silicone oil, mineral oils, vegetable oils, or combinations thereof. An embodiment of the invention is one, any or all of prior embodiments in this paragraph up through the second embodiment in this paragraph, wherein the liquid protective layer has a thickness between 0.1 to 100 cm. An embodiment of the invention is one, any or all of prior embodiments in this paragraph up through the second embodiment in this paragraph, further comprising an inert gas disposed between the liquid protective layer and the vessel. An embodiment of the invention is one, any or all of prior embodiments in this paragraph up through the second embodiment in this paragraph, wherein the electrolyte comprises a catholyte electrolyte, an anolyte electrolyte, a fresh electrolyte, or combinations thereof.

A third embodiment of the invention is an electrolyte tank for a flow battery, the electrolyte tank comprising a closed vessel having an inlet and an outlet, a liquid electrolyte in the closed vessel, and a protective layer on top of the liquid electrolyte, wherein the protective layer comprises a substrate impregnated with a light oil comprising hydrophobic hydrocarbons, the light oil having a density lower than a density of the electrolyte, the hydrophobic hydrocarbons being non-reactive to the electrolyte. An embodiment of the invention is one, any or all of prior embodiments in this paragraph up through the third embodiment in this paragraph, wherein the substrate comprises an oil absorbing material. An embodiment of the invention is one, any or all of prior embodiments in this paragraph up through the third embodiment in this paragraph, wherein the oil absorbing material is selected from a group consisting of natural fabrics, synthetic fabrics, inorganic material, and biomass materials. An embodiment of the invention is one, any or all of prior embodiments in this paragraph up through the third embodiment in this paragraph, wherein the substrate has a thickness between 0.1 to 100 cm. An embodiment of the invention is one, any or all of prior embodiments in this paragraph up through the third embodiment in this paragraph, wherein the light oil is selected from a group consisting of silicone oil, mineral oils, vegetable oils, or combinations thereof. An embodiment of the invention is one, any or all of prior embodiments in this paragraph up through the third embodiment in this paragraph, further comprising an inert gas disposed between the liquid protective layer and the vessel. An embodiment of the invention is one, any or all of prior embodiments in this paragraph up through the third embodiment in this paragraph, wherein the inert gas comprises nitrogen or argon. An embodiment of the invention is one, any or all of prior embodiments in this paragraph up through the third embodiment in this paragraph, wherein the electrolyte comprises a catholyte electrolyte, an anolyte electrolyte, a fresh electrolyte, or combinations thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A flow battery comprising:
an electrolyte; and a protective layer disposed on the electrolyte, the protective layer comprising:
a substrate impregnated with a light oil comprising hydrophobic hydrocarbons, wherein the light oil having a density lower than a density of the electrolyte, the hydrophobic hydrocarbons being non-reactive to the electrolyte.

2. The flow battery of claim 1, wherein the substrate comprises an oil absorbing material.

3. The flow battery of claim 2, wherein the oil absorbing material is selected from a group consisting of: natural fabrics, synthetic fabrics, inorganic material, and biomass materials.

4. The flow battery of claim 1, wherein the substrate has a thickness between 0.1 to 100 cm.

5. The flow battery of claim 1, wherein the light oil is selected from a group consisting of: silicone oil, mineral oils, vegetable oils, or combinations thereof.

6. An electrolyte tank for a flow battery, the electrolyte tank comprising:
a closed vessel having an inlet and an outlet,
a liquid electrolyte in the closed vessel, and
a protective layer on top of the liquid electrolyte, wherein the protective layer comprises a substrate impregnated with a light oil comprising hydrophobic hydrocarbons, the light oil having a density lower than a density of the liquid electrolyte, the hydrophobic hydrocarbons being non-reactive to the liquid electrolyte.

7. The electrolyte tank of claim 6, wherein the substrate comprises an oil absorbing material.

8. The electrolyte tank of claim 7, wherein the oil absorbing material is selected from a group consisting of: natural fabrics, synthetic fabrics, inorganic material, and biomass materials.

9. The electrolyte tank of claim 6, wherein the substrate has a thickness between 0.1 to 100 cm.

10. The electrolyte tank of claim 6, wherein the light oil is selected from a group consisting of: silicone oil, mineral oils, vegetable oils, or combinations thereof.

11. The electrolyte tank of claim 6, further comprising:
an inert gas disposed between the liquid protective layer and the vessel.

12. The electrolyte tank of claim 11, wherein the inert gas comprises nitrogen or argon.

13. The electrolyte tank of claim 6, wherein the liquid electrolyte comprises a catholyte electrolyte, an anolyte electrolyte, a fresh electrolyte, or combinations thereof.

* * * * *